US009150180B1

(12) United States Patent
Faruque et al.

(10) Patent No.: US 9,150,180 B1
(45) Date of Patent: Oct. 6, 2015

(54) INFLATABLE PROTECTION MECHANISMS FOR VEHICLE INSTRUMENT PANEL

(71) Applicant: Ford Global Technologies, LLC, Dearborn, MI (US)

(72) Inventors: Mohammed Omar Faruque, Ann Arbor, MI (US); James Chih Cheng, Troy, MI (US); Robert William McCoy, Ann Arbor, MI (US); Jamel E. Belwafa, Ann Arbor, MI (US); Jaeho Cho, Shelby Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/458,287

(22) Filed: Aug. 13, 2014

(51) Int. Cl.
*B60R 21/045* (2006.01)
*B60R 21/205* (2011.01)
*B60R 21/04* (2006.01)

(52) U.S. Cl.
CPC ....... *B60R 21/045* (2013.01); *B60R 2021/0407* (2013.01)

(58) Field of Classification Search
CPC  B60R 21/045; B60R 21/205; B60R 21/2165; B60R 21/36; B60R 2021/024; B60R 2021/0407
USPC .......... 280/728.3, 732, 752, 753; 296/187.04
See application file for complete search history.

(56) References Cited

U.S. PATENT DOCUMENTS

| | | | | |
|---|---|---|---|---|
| 3,514,124 A | * | 5/1970 | Richardson | 280/732 |
| 3,624,810 A | * | 11/1971 | Hass | 280/738 |
| 3,801,126 A | * | 4/1974 | Knight et al. | 280/732 |
| 3,817,552 A | * | 6/1974 | Knight et al. | 280/732 |
| 5,360,231 A | * | 11/1994 | Adams | 280/728.2 |
| 5,382,051 A | * | 1/1995 | Glance | 280/751 |
| 5,507,519 A | | 4/1996 | Schettler-Köhler | |
| 5,536,043 A | * | 7/1996 | Lang et al. | 280/753 |
| 5,931,493 A | * | 8/1999 | Sutherland | 280/730.1 |
| 5,931,498 A | * | 8/1999 | Keshavaraj | 280/743.1 |
| 6,170,871 B1 | * | 1/2001 | Goestenkors et al. | 280/743.1 |
| 6,299,209 B1 | * | 10/2001 | Ankersson et al. | 280/753 |
| 6,305,710 B1 | * | 10/2001 | Bosgieter et al. | 280/753 |
| 6,435,554 B1 | * | 8/2002 | Feldman | 280/743.2 |
| 6,471,242 B2 | * | 10/2002 | Schneider | 280/732 |
| 6,712,385 B2 | * | 3/2004 | Enders | 280/730.1 |
| 6,752,417 B2 | * | 6/2004 | Takimoto et al. | 280/730.1 |
| 6,846,015 B2 | * | 1/2005 | Meduvsky et al. | 280/753 |
| 6,874,811 B2 | * | 4/2005 | Enders et al. | 280/730.1 |
| 7,048,298 B2 | * | 5/2006 | Arwood et al. | 280/730.1 |
| 7,213,840 B2 | * | 5/2007 | Kumagai | 280/752 |

(Continued)

FOREIGN PATENT DOCUMENTS

JP          05208647         8/1993

*Primary Examiner* — Laura Freedman
(74) *Attorney, Agent, or Firm* — Frank A. MacKenzie; Bejin Bieneman PLC

(57) ABSTRACT

An apparatus includes first and second cover segments adjacent one another and collectively defining a surface of an instrument panel for a vehicle in an installed position of the first cover segment and a support member spaced away from the first cover segment opposite the surface. The apparatus further includes a sidewall body extending between the first cover segment and the support member and enclosing a first volume therein and an inflator fluidly coupled to the first volume. When the inflator expands the first volume, the sidewall body extends away from the support member and respectively displaces the first cover segment to a deployed position away from the second cover segment.

20 Claims, 3 Drawing Sheets

(56) References Cited

U.S. PATENT DOCUMENTS

| | | |
|---|---|---|
| 7,367,587 B2 * | 5/2008 | Taoka .......................... 280/751 |
| 8,267,424 B2 | 9/2012 | Tomitaka et al. |
| 8,596,681 B1 * | 12/2013 | Strunk et al. .................. 280/752 |
| 2004/0100080 A1 * | 5/2004 | DePue et al. ................ 280/743.1 |
| 2008/0129024 A1 | 6/2008 | Suzuki et al. |

* cited by examiner

INFLATABLE PROTECTION MECHANISMS FOR VEHICLE INSTRUMENT PANEL

BACKGROUND

Vehicles, such as automobiles, may include equipment for mitigating the impact of collisions. For example, many vehicles include equipment such as safety belts, airbags and energy absorption mechanisms to help protect passengers in the event of a collision with another vehicle. In another example, a vehicle may include equipment such as bumper- or hood-mounted airbags and hood-lifting systems to help protect a pedestrian that collides with the vehicle. It is desirable to supplement such protection mechanisms within the bounds of a typical architecture for such a vehicle.

DRAWINGS

DETAILED DESCRIPTION

The present disclosure includes inflatable protection mechanisms for implementation in a vehicle instrument panel. One or more cover segments for the instrument panel may be respectively deployed away from the surface of the instrument panel through inflation of a corresponding closed body and/or assembly under the one or more cover segments. The deployment of the one or more cover segments may be controlled by a vehicle computer to correspond with particular vehicle circumstances, e.g., certain types of impact events. The one or more cover segments may be included in a vehicle in addition to existing safety features, e.g., driver and passenger side airbags, seat belts, side curtain airbags, bumper- and/or hood-mounted airbags, and hood-lifting systems. It should be understood that this disclosure is exemplary in nature.

Figure 1:
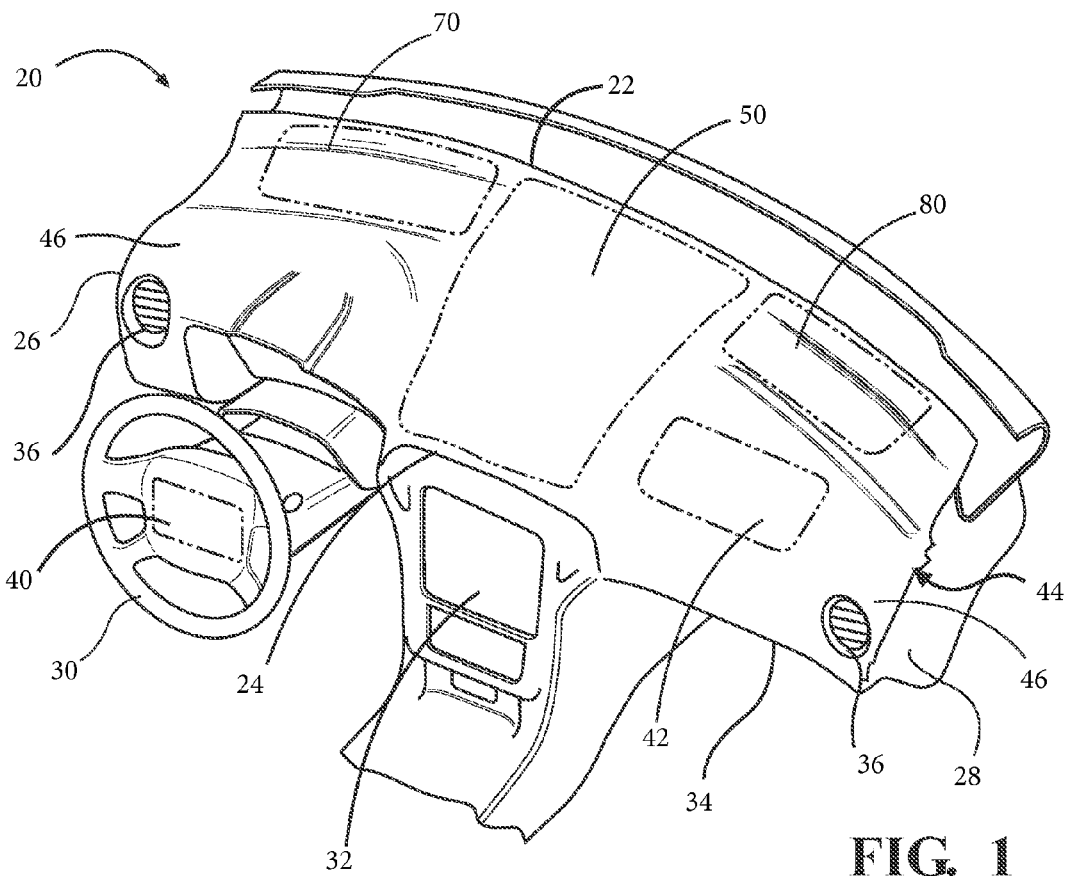
FIG. 1 is a perspective view of an exemplary vehicle instrument panel with inflatable portions illustrated in phantom.
Figure 2:
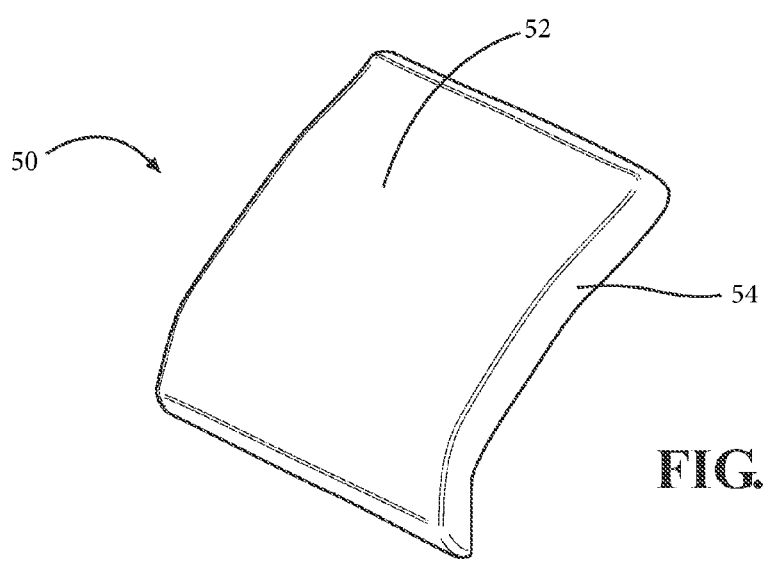
FIG. 2 is a perspective view of an exemplary inflatable instrument panel portion.
Figure 3:
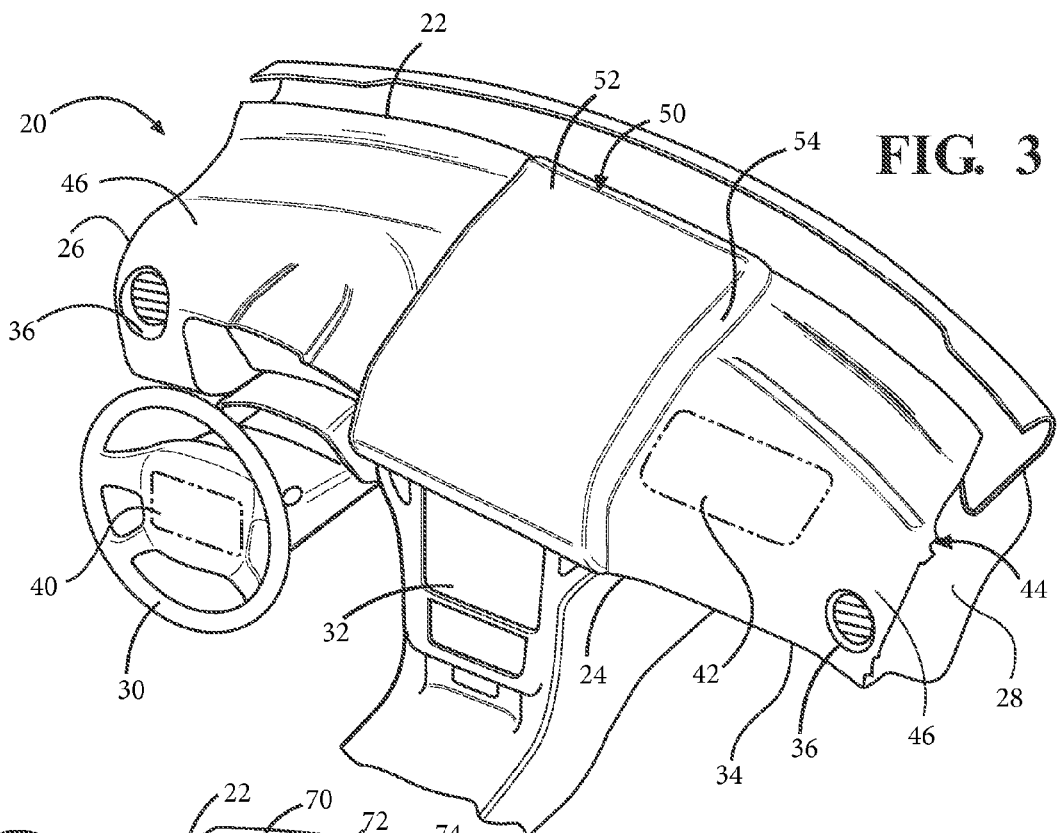
FIG. 3 is a perspective view of an exemplary vehicle instrument panel with a center inflatable instrument panel portion in a deployed configuration.

Referring to FIG. 1, an exemplary vehicle instrument panel 20, e.g., for a passenger car, sport utility vehicle, pick-up truck, van, minivan, etc., includes a longitudinally forward end 22, e.g., near the windshield (not shown) for the vehicle, and an inner, longitudinally rearward end 24. The instrument panel 20 has first and second ends 26, 28 at laterally opposing edges thereof. While, in the illustrated implementation, the first end 26 corresponds with the driver side for the vehicle and the second end 28 corresponds with the passenger side for the vehicle, it should be understood that the vehicle and instrument panel 20 may have a variety of configurations, such as the driver and passenger sides of the vehicle arranged in the opposite configuration. Along the longitudinally rearward end 24, the instrument panel 20 supports a steering wheel 30 proximate the first end 26, a user interface 32 in the center thereof, a glove box 34 proximate the second end 28, and vents 36.

The instrument panel 20 further supports a driver airbag mechanism 40 disposed within the steering wheel 30 and a passenger airbag mechanism 42 disposed near the second end 28 and the glove box 34. It should be understood that the driver and passenger airbag mechanism 40, 42 may be any suitable vehicle occupant airbag mechanism.

The instrument panel 20 also includes a cover 44 with a fixed cover segment 46 adjacent to and/or surrounding an inflatable center portion 50. It should be understood that the fixed cover segment 46 is exemplary, and that a cover for an instrument panel according to the principles of the present disclosure may have a plurality of fixed portions or segments, as dictated by the particular vehicle shape, configuration, options, materials, etc. The inflatable center portion 50 extends substantially across the longitudinal width of the instrument panel 20 between the longitudinally forward end 22 and the longitudinally rearward end 24. In certain impact events, e.g., where an oblique force is applied at the front end of a vehicle, movement of either the driver or the front seat passenger toward the center of the vehicle and away from the driver or passenger airbag mechanisms 40, 42 may be expected. According to the principles of the present disclosure, the inflatable center portion 50 may be deployed in response to such an impact event to provide collision mitigation in the expected path of movement of a vehicle occupant toward the inflatable center portion 50. The vehicle may include additional features, such as side curtain airbags (not shown), to provide collision mitigation for other expected movement away from the driver or passenger airbag mechanism 40, 42 and the inflatable center portion 50.

With additional reference to FIGS. 2-5, the inflatable center portion 50 includes a cover segment 52 defining the top surface of the inflatable center portion 50. With the inflatable center portion 50 in a stowed or uninflated position (FIG. 1), the cover segment 52 is substantially aligned with the fixed cover segment 46 of the cover 44. The inflatable center portion 50 further includes a sidewall body 54 coupled to the underside of the cover segment 52 and extending between the cover segment 52 and a support member 56, e.g., an instrument panel beam or structural member coupled to the frame assembly for the vehicle. The cover segment 52, the sidewall body 54 and the support member 56 enclose a first volume 58. A first inflator 60 supported by the vehicle is fluidly coupled to the first volume 58 via a port, tube, aperture or any other suitable fluid connection structure (not shown) between the cover segment 52, the sidewall body 54 and/or the support member 56.

Figure 5:
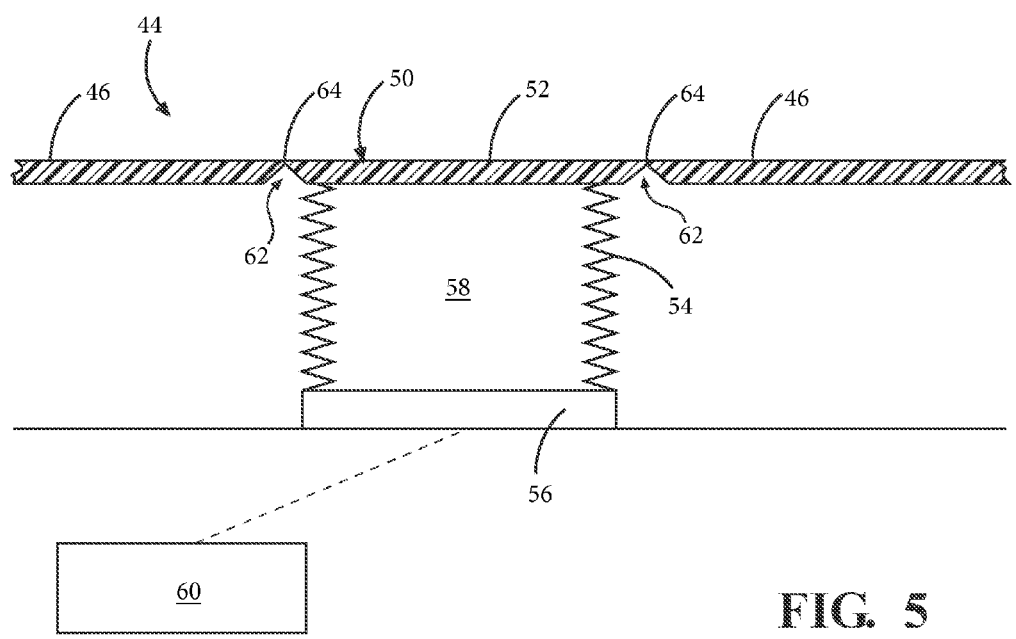
FIG. 5 is a partially cross-sectional and partially schematic view of an exemplary inflatable instrument panel portion and inflator therefor.

The fixed cover segment 46 and the cover segment 52 may be formed of the same material or combination of materials, and may include a variety of materials, e.g., plastic materials, composite materials, and elastomeric materials, by way of non-limiting example. The sidewall body 54 may have a variety of configurations and/or materials. For example, the sidewall body 54 may include a plastic material, an elastomeric material, or a combination of two or more materials in an "accordion," i.e., accordion-folded, telescoping, or other folded configuration, such as illustrated in FIG. 5, to allow for expansion upon the inflation of the first volume 58. In other implementations, the sidewall body 54 may include a substantially impermeable fabric material such as is used for airbags, or an elastomeric material which may elastically deform upon inflation of the first volume 58.

As illustrated in the exemplary configuration of FIG. 5, with the inflatable center portion 50 in the stowed or uninflated position, the fixed cover segment 46 and the cover segment 52 may be mechanically joined. In one example, the fixed cover segment 46 and the cover segment 52 are integrally formed, and a groove 62 is scored in the underside thereof such that a relatively thin joint or connecting portion 64 extends between the fixed cover segment 46 and the cover segment 52. The joint 64 is sufficiently thin, depending on the particular material or materials and the configuration of the inflatable center portion 50 and the components thereof, so as to break upon inflation of the first volume 58 and allow deployment of the inflatable center portion 50 into the passenger cabin, away from the fixed cover segment 46 of the cover 44 for the instrument panel 20. In other embodiments, the fixed cover segment 46 and the cover segment 52 may be aligned without a direct mechanical connection, or may be mechanically fixed with adhesive, integral spaced-apart perforations, an overlapping border segment, etc.

The vehicle deploys the inflatable center portion 50 under certain conditions, e.g., an oblique impact at the front end of the vehicle at or above a threshold magnitude. For example, the vehicle may include a vehicle computer or control module (not shown), in communication with the inflator 60, which computer or control module generally includes a processor and a memory, the memory including one or more forms of computer-readable media, and storing instructions executable by the processor for performing various operations, including as disclosed herein. Further, the computer may include more than one computing device, e.g., controllers or the like included in the vehicle for monitoring and/or controlling various vehicle components, e.g., an engine control unit (ECU), transmission control unit (TCU), etc. The computer is generally configured for communications on a controller area network (CAN) bus or the like. The computer may also have a connection to an onboard diagnostics connector (OBD-II). Via the CAN bus, OBD-II, and/or other wired or wireless mechanisms, the computer may transmit messages to various devices in a vehicle and/or receive messages from the various devices, e.g., controllers, actuators, sensors, the driver and passenger airbag mechanisms 40, 42, the inflator 60, etc. Alternatively or additionally, in cases where the computer actually comprises multiple devices, the CAN bus or the like may be used for communications between the multiple devices that comprise the vehicle computer. In addition, the computer may be configured for communicating with a network, which may include various wired and/or wireless networking technologies, e.g., cellular, Bluetooth, wired and/or wireless packet networks, etc. According to the principles of the present disclosure, when the computer determines, e.g., by comparing and processing impact severity and location information from vehicle sensors and stored data such as impact thresholds, that movement of either the driver or the front seat passenger toward the center of the vehicle, away from the driver or passenger airbag mechanism 40, 42, is expected, the computer may instruct or control the inflator 60 to deploy the inflatable center portion 50 to provide collision mitigation for the expected movement of a vehicle occupant toward the inflatable center portion 50.

Figure 4:
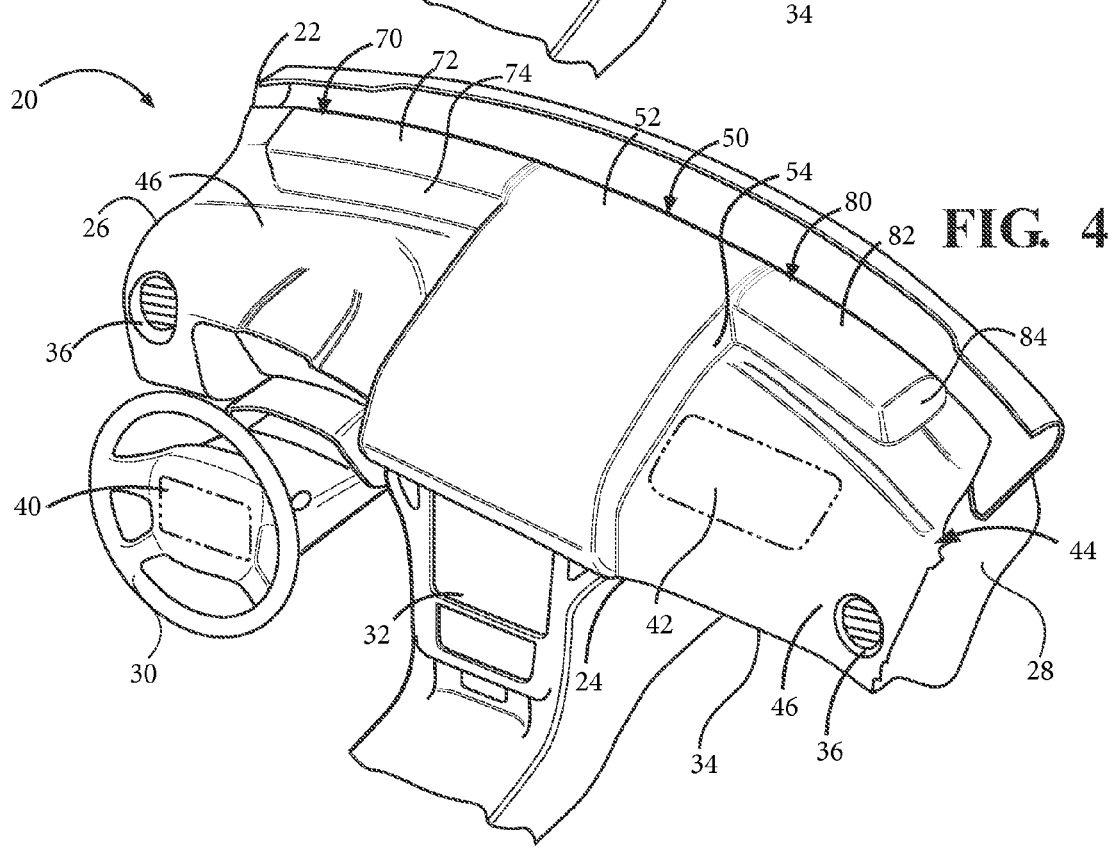
FIG. 4 is a perspective view of an exemplary vehicle instrument panel with center and auxiliary inflatable instrument panel portions in deployed configurations.

Referring to FIGS. 1 and 4, a vehicle according to the principles of the present disclosure may include one or more auxiliary inflatable portions independent of or in addition to an inflatable center portion in the instrument panel. For example, in addition to the inflatable center portion 50, the exemplary instrument panel 20 includes a first auxiliary inflatable portion 70 with a cover segment 72 and a sidewall body 74, and a second auxiliary inflatable portion 80 with a cover segment 82 and a sidewall body 84. It should be understood that the first and second auxiliary inflatable portions 70, 80 may be configured as described herein with respect to the inflatable center portion 50. For example, the cover segments 72, 82 align with the fixed cover segment 46 when the first and second auxiliary inflatable portions 70, 80 are in stowed or uninflated positions, respectively, and may be mechanically joined with the fixed cover segment 46 as described above with regard to the cover segment 52. The sidewall bodies 74, 84 extend between the cover segments 72, 82 and a support member, such as the instrument panel beam or another vehicle frame component (not shown). As described with respect to the inflatable center portion 50, the first and second auxiliary inflatable portions 70, 80 each enclose a volume fluidly coupled to an inflator mechanism. In some implementations, the first and second auxiliary inflatable portions 70, 80 are coupled to second and third inflators, respectively, which may be communicatively coupled to the vehicle computer. In other implementations, two or more of the inflatable center portion 50 and the first and second auxiliary inflatable portions 70, 80 may be operably coupled to a single inflator, e.g., the inflator 60. It should be understood that any suitable inflator mechanism, e.g., inflators used for vehicle passenger airbags, may be used.

In some impact events for a vehicle, such as an impact of the front end of a vehicle with a pedestrian, contact between the pedestrian and the vehicle windshield may be anticipated. According to the principles of the present disclosure, the exemplary first and second auxiliary inflatable portions 70, 80 may be deployed in response to such an impact event to provide mitigation of potential impact of the pedestrian at the vehicle windshield. The vehicle may include additional features, such as hood mounted airbags or hood lifting mechanisms, in addition to the first and second auxiliary inflatable portions 70, 80.

Additionally, according to the principles of the present disclosure, the computer of the vehicle may control or instruct the first and second auxiliary inflatable portions 70, 80. For example, when the computer determines a pedestrian impact event has occurred at the vehicle front end, e.g., by comparing and processing impact severity and location information from vehicle sensors and stored data such as impact thresholds and force profiles, the computer may instruct or control the one or more inflators for the first and second auxiliary inflatable portions 70, 80 to deploy one or both of the first and second auxiliary inflatable portions 70, 80 to provide collision mitigation for potential impact of a pedestrian with the windshield.

Inflatable passenger protection mechanisms for vehicle instrument panels according to the present disclosure may further vary in numerous ways. For example, the various components may have a variety configurations, e.g., according to the particular sizes and configurations of various passenger vehicles. In another example, the portions of the cover for an instrument panel according to the present disclosure may include a variety of materials.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. It should be understood that, as used herein, exemplary refers to serving as an illustration or specimen, illustrative, or typical. The scope of the disclosure should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. An apparatus comprising:
   first and second cover segments adjacent one another and collectively defining an upward-facing surface of an instrument panel for a vehicle in an installed position of the first cover segment;
   a support member spaced away from the first cover segment opposite the surface;
   a sidewall body attached to the first cover segment and extending between the first cover segment and the support member and enclosing a first volume therein; and
   an inflator fluidly coupled to the first volume,
   wherein, when the inflator expands the first volume, the sidewall body extends away from the support member and respectively displaces the entire first cover segment away from the upward-facing surface of the instrument panel to a deployed position away from the second cover segment.

2. The apparatus of claim 1, further comprising a joint between the first and second cover segments, the joint being engaged when the first cover segment is in the installed position;
   wherein the expansion of the first volume and the extension of the sidewall body disengages the joint.

3. The apparatus of claim 2, wherein the first and second cover segments are integrally formed, and the joint and a scored recess extend between the first and second cover segments.

4. The apparatus of claim 3, wherein the scored recess is formed into an underside of the first and second cover segments opposite the surface.

5. The apparatus of claim 2, wherein, when the joint is engaged and the first cover segment is in the installed position, the surface is substantially continuous across the first and second cover segments.

6. The apparatus of claim 1, wherein the sidewall body is folded when the first cover segment is adjacent the second cover segment.

7. The apparatus of claim 6, wherein the sidewall body includes one of a foldable plastic material, an elastomeric material, and a flexible substantially impermeable fabric material.

8. The apparatus of claim 6, wherein the sidewall body is substantially accordion-folded when the first cover segment is adjacent the second cover segment.

9. The apparatus of claim 6, wherein the sidewall body is telescopically folded when the first cover segment is adjacent the second cover segment.

10. The apparatus of claim 1, wherein the sidewall body includes a combination of materials.

11. The apparatus of claim 1, wherein the sidewall body includes an elastomeric material.

12. An assembly comprising:
    an instrument panel beam secured to a frame of a vehicle;
    first and base cover segments spaced away from the instrument panel beam, the first cover segment aligned with a substantially central region of the instrument panel beam, the first and base cover segments being adjacent one another in an installed position of the first cover segment and collectively defining at least a part of an upward-facing surface of an instrument panel for a vehicle facing opposite the instrument panel beam;
    a first sidewall body attached to the first cover segment and extending between the first cover segment and the instrument panel beam and enclosing a first volume therein; and
    a first inflator fluidly coupled to the first volume,
    wherein, when the first inflator expands the first volume, the first sidewall body extends away from the instrument panel beam and respectively displaces the entire first cover segment away from the upward-facing surface of the instrument panel to a deployed position away from the base cover segment.

13. The assembly of claim 12, further comprising:
    a second cover segment defining at least a part of the surface of the instrument panel in an installed position aligned with the base cover segment;
    a second sidewall body extending between the second cover segment and the instrument panel beam and enclosing a second volume therein; and
    a second inflator fluidly coupled to the second volume,
    wherein, when the second inflator expands the second volume, the second sidewall body extends away from the instrument panel beam and respectively displaces the second cover segment to a deployed position away from the base cover segment.

14. The assembly of claim 13, further comprising:
    a third cover segment defining at least a part of the surface of the instrument panel in an installed position aligned with the base cover segment;
    a third sidewall body extending between the third cover segment and the instrument panel beam and enclosing a third volume therein; and
    a third inflator fluidly coupled to the third volume,
    wherein, when the third inflator expands the third volume, the third sidewall body extends away from the instrument panel beam and respectively displaces the third cover segment to a deployed position away from the base cover segment.

15. The assembly of claim 14, wherein the second and third cover segments are positioned proximate a forward periphery of the instrument panel.

16. The assembly of claim 15, wherein the second and third cover segments have substantially laterally opposing positions relative to the first cover segment.

17. The assembly of claim 15, further comprising driver and passenger airbag mechanisms respectively coupled to the instrument panel beam in substantially laterally opposing positions proximate a rearward periphery of the instrument panel.

18. The assembly of claim 12, wherein the first sidewall body is folded when the first cover segment is adjacent the base cover segment.

19. The assembly of claim 18, wherein the first sidewall body is substantially accordion-folded when the first cover segment is adjacent the base cover segment.

20. The assembly of claim 18, wherein the first sidewall body is telescopically folded when the first cover segment is adjacent the base cover segment.

* * * * *